Feb. 20, 1934.  D. M. CARR  1,948,368
SYSTEM OF METERING
Filed April 27, 1929   2 Sheets-Sheet 1

INVENTOR.
David M. Carr
BY John O. Lind
ATTORNEYS.

Feb. 20, 1934. D. M. CARR 1,948,368
SYSTEM OF METERING
Filed April 27, 1929 2 Sheets-Sheet 2

Inventor
DAVID M. CARR
By John E Reid
Attorney

Patented Feb. 20, 1934

1,948,368

UNITED STATES PATENT OFFICE 1,948,368

SYSTEM OF METERING

David M. Carr, Brooklyn, N. Y.

Application April 27, 1929. Serial No. 358,674

17 Claims. (Cl. 235—91)

This invention relates to systems for metering electrical energy, gas or various other commodities and particularly to multiple rate systems in which the consumer is charged different rates for the energy consumed depending upon the particular time during the day at which he consumes the energy.

It is also an object of my invention to provide indicating devices upon the system which will indicate the time at which a change in rate occurs and will also indicate the particular rate which is in operation at any particular time.

These objects are accomplished by utilizing two or more sets of registering meters which are connected to the actuating mechanism at predetermined times by a system of gears mounted upon a lever which is pivoted to the main frame of the meter and is so arranged that these gears may be drawn away from one register and meshed with another register either by hand, by a spring driven mechanism, by an electrically driven motor, by electromagnets controlled by a time mechanism or any other suitable means, thereby separately registering or measuring the commodity used or the passengers carried or whatever it is desired to measure, during certain periods at one rate and during other periods at another rate, without the necessity of using separate and distinct meters and expensive valves, gates, turnstiles, switches, etc., to connect the consuming devices to the supply line, or pipe that passes the commodity or articles through the meters.

Particularly an important object of my invention is to provide a system of metering electrical energy which will induce consumers to use such energy freely during the period of the generating station's light load and to discourage the consumption of energy during the period of peak load to thereby improve the present load curve of the station.

With these and other objects in view as will hereinafter appear, my invention consists in the construction, arrangement and combination of the various parts of my device, whereby the objects contemplated are attained, as hereinafter more fully set forth, pointed out in my claims, and illustrated in the accompanying drawings, in which:

In the drawings like reference characters refer to like parts.

Figure 1:
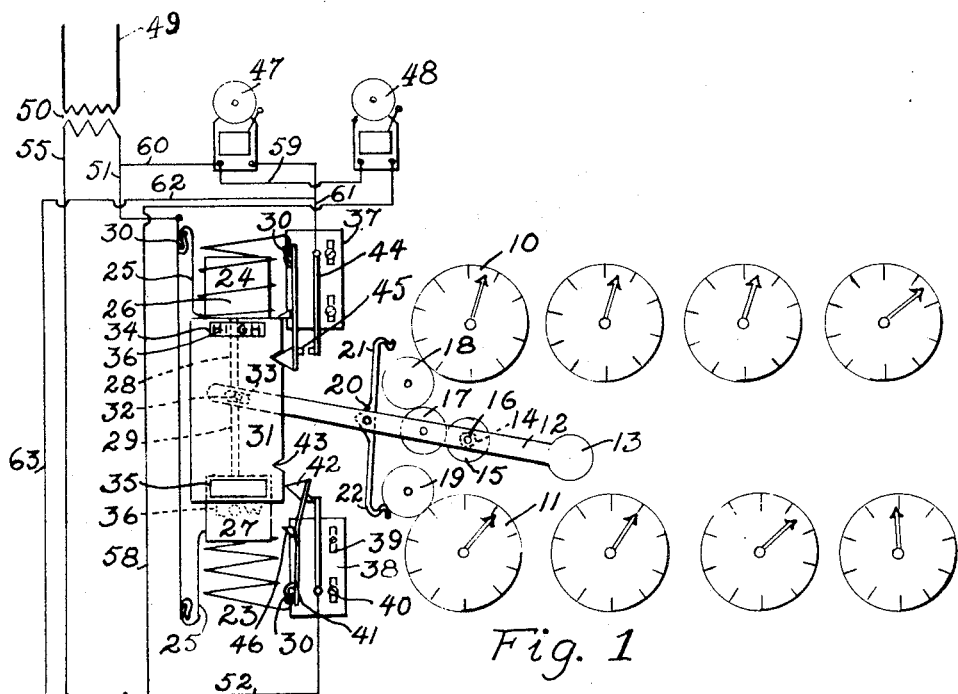
Figure 1 is a diagrammatic view showing my device.

Referring to the drawings 10 indicates a set of registering dials such as are commonly used in electric meters and 11 indicates another set of registering dials of the same type but registering at a lower rate. If desired a third set of registering dials might be used which would register at a medium rate.

Lever 12 having the weighted counter-balancing end 13 is pivoted to the main frame of the meter by bearing 14 which is rigidly secured to the movable lever 12 but is free to turn in the main frame and thereby allows the lever 12 to pivot. Gear wheel 15 is mounted upon a horizontal shaft 16 which is driven by a worm (not shown) on the vertical actuating shaft or the usual drum armature of an electric meter. The shaft 16 is carried in the bearing 14 mounted upon the main frame of the meter.

Also carried by the lever 12 is a gear 17 meshing with the gear 15 and the gear 17 is adapted to mesh with either the gear 18 connected to the high rate registering dials or the gear 19 connected to the low rate registering dials depending upon the position in which the lever 12 is moved. In the position shown in Figure 1 the gear 17 is meshing with the gear 18 and thereby connected to the high rate registering dials.

Mounted upon the lever 12 is also a member 20 carrying two spring stops 21 and 22. When the lever is in its upper position with the gear 17 meshing with the gear 18 spring stop 22 locks between the teeth in gear 19 and prevents the lower train of gears from creeping. Upon movement of the lever 12 to its lower position the spring stop 21 will lock the gear 18 and prevent the upper set of registering dials from creeping.

The means for actuating the lever 12 will now be described.

23 and 24 are solenoid electro-magnets having the interchangeable helixes 25 and the cores 26 and 27. Core 26 is connected to the lever 12 by the link 28 and core 27 is connected to the lever 12 by the link 29. These links can if desired be connected in any well known manner preferably pivotally at both ends. The helixes 25 have terminals which can be snapped into the spring contacts 30.

A plate 31 is connected to the lever 12 by means of a pin 32 upon the plate and a slot 33 provided in the lever 12. The plate 31 is provided with an opening 34 at the top thereof and an opening 35 at the bottom thereof which openings when the plate is moved by the movement of the lever 12 will disclose fixed indicia 36 carried by the framework indicating whether the high rate registering dials are functioning or whether the low rate registering dials are registering.

Mounted upon the framework of the device are adjustable plates 37 and 38. These plates are provided with slots 39 allowing the adjustment of the plates and are fixed in position by the set screws 40. Each plate carries spring locking members 41, the locks 42 of which are adapted to snap into and out of the notches 43 provided in the plate 31. The plates 37 and 38 also carry contactors 44 which are adapted to make contact with the contactors 45 mounted upon the spring locking members 41. The plates 37 and 38 also carry the fixed stop members 46 and certain of the spring contacts 30 are mounted upon the spring stops 41.

It will be noted that when the locking portion 42 of the spring stops 41 is located in the notch 43, contact is broken between the contacts 44 and 45 while when the stop 42 is out of the notch 43 contact is made between the contacts 44 and 45. In the position shown in Figure 1 contact is broken between the upper spring stop and its contactor 44 while contact is made between the lower spring stop 41 and its contactor 44.

47 and 48 are signal bells which are wired in parallel with the solenoids 23 and 24 so that whenever the plate 31 is moved a signal is sounded upon one of these bells. Should the bell continue to ring it will indicate that the mechanism has failed to properly function and will act as a warning to remedy the same.

The main line circuit is indicated at 49 and a transformer 50 is located therein. It is obvious that the transformer 50 may be discarded if the electric current can be used direct provided the voltage is suitable. A line 51 leads to both of the helixes 25 and the circuit is broken in the upper helix in Figure 1 between contacts 45 and 44 while in the lower helix the circuit continues through the helix 25, through spring stop 41, contact 45, contact 44 and line 52 to flexible element 53 connected to the two pole plug 54.

It is evident that if the circuit is closed between the poles 57 of the plug 54 that the lower solenoid 23 will be energized and draw the core 27 thereof downwardly and through the link 29 draw the lever 12 also downwardly and shift the gear 17 into mesh with the gear 19 so that the meter will register at the lower rate. At the same time the plate 31 will be moved downwardly with the lever and the opening 35 will then register with the indicia 36 and disclose that the meter is now registering at the lower rate. At the same time a circuit will be set up through line 52, line 58, bell 48, line 59 and line 60 which will ring bell 48 indicating that a change has been made.

When the solenoid 27 is in its lower position the stop 42 of the upper spring stop 41 is moved outwardly and contact is established between contacts 44 and 45 so that the apparatus is in condition to be operated so as to again register at the high rate when a circuit is established through the lines now to be described.

The line 51 connects with the upper helix 25 and the helix is connected to the upper spring stop 41 and the circuit continues through contact 45, contact 44, line 61, line 62, line 63, flexible line 64 and to the two pole plug 65. Line 55 from the transformer is connected by the flexible line 66 also to the two pole plug 65. When the poles 67 of the two pole plug 65 are connected together the upper helix 25 is energized and will draw the core 26 upwardly and the plate 31 will be locked in its upper position by the stop 42 snapping into its notch 43. In this case the bell 47 will be energized through the line 61 and the line 60.

The use of the transformer 50 is of course desirable in order to reduce arcing at the contact points in the time switch which is to be described below and at the local contactors throughout the device.

Figure 2:
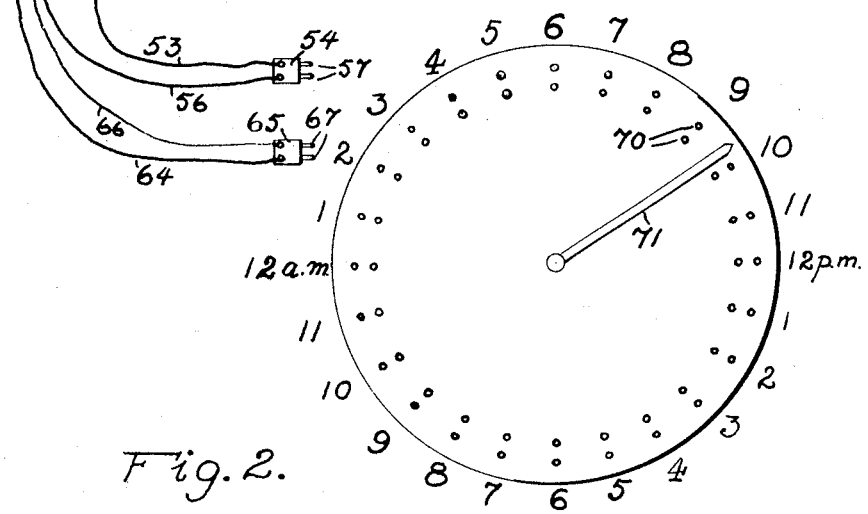
Figure 2 is a plan view of the controlling means used.
Figure 3:
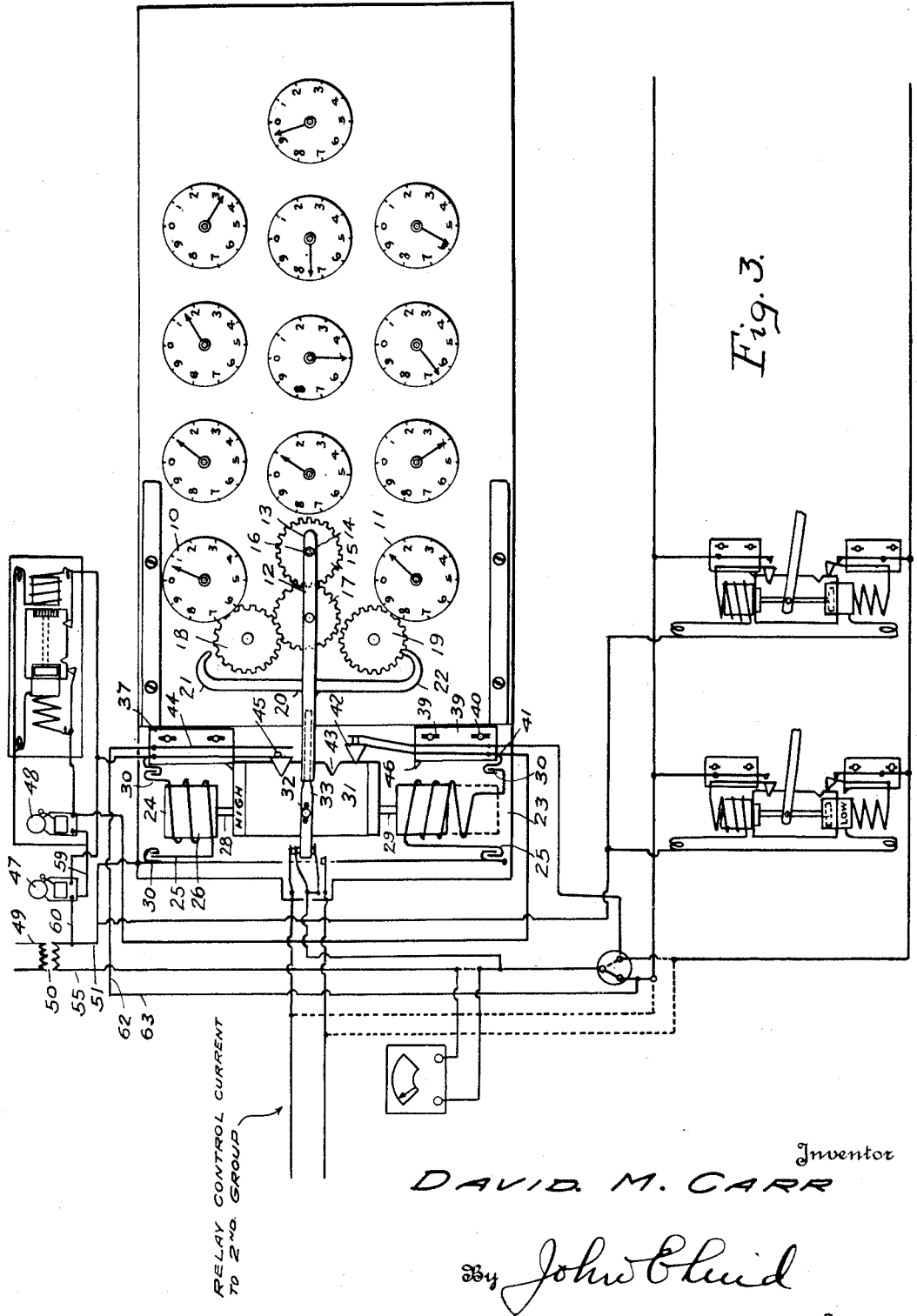
Figure 3 is a diagrammatic view of the invention showing a modification.

In Figure 2 is shown a plan view of a time switch having a series of apertures 70 in which the poles 57 or 67 are adapted to be inserted. The metallic hand 71 is rotated by any desired mechanism at a rate corresponding to the time period during the day. As the hand traverses around during the different hours of the day it will make contact between the two poles 57 or the two poles 67 when they have been inserted in the apertures 70 thereby closing a circuit through the solenoids 23 and 24 as above described. With this device it is obvious that the plugs 57 and 67 can be located so that the mechanism can be operated at any hour during the day desired.

The adjustment of the plates 37 and 38 allows the mechanism to be easily adjusted so that the gear 17 will mesh freely with the gears 18 and 19.

It is obvious that the duration of the signal by the bells 47 and 48 can be regulated by adjusting the contacts upon a time switch of usual design.

By using another set of contacts at 44 and 45 it is obvious that lights or other suitable signals can be operated either upon the premises which are metered or at a point remote from the place at which the meter is recording. This remote indication can also be accomplished by installing another solenoid mechanism at a distant place which is connected in parallel with the solenoids 23 and 24 and this remote solenoid device would also indicate the condition of the meters and the rate at which they are operating. This construction of course would not necessitate any additional contacts at the position now occupied by contacts 44 and 45.

It is also obvious that this duplex metering may be used on a meter of any capacity and if desired one can use two relays with the timing mechanism shown in Figure 2 whereby one timing mechanism can be used to control simultaneously any number of meters grouped in one building or grouped in several buildings by connecting all the twenty-three solenoids to one relay and all the twenty-four solenoids to the other relay in parallel.

It is also obvious that in place of the double series of holes 70 it is only necessary to have one circle of holes and the other end of the circuit can be attached to the moving arm 71. By this means the circuit can be closed in the same manner as shown in Figure 2.

The gear wheel 17 is so pivoted that it will always move upon an arc which is of smaller or greater radius than that of the fixed gear wheels 18 and 19. In this manner the points of the gear teeth can never meet in a straight line and it will be insured that the gears will properly mesh.

Some changes may be made in the construction, and arrangement of the invention above set forth, without departing from the real purpose and spirit thereof, and it is the intention to cover by the following claims, any modified forms of structure or use of equivalents, which may be reasonably included within their scope.

I claim:

1. The combination in a metering device of a plurality of sets of registering trains, a pivoted arm, a movable meter driven gear wheel mounted on said pivoted arm, electromagnets for moving same, and adjustable contactors to shut off the current when the gear wheel reaches an operating position.

2. The combination in a metering device comprising a plurality of sets of registering dials, of a pivoted movable lever, means carried by said lever and operated by the meter, momentary electro-magnetic means for alternately moving said lever to directly mesh said meter operated means with one of said sets of registering dials and disengage said meter operated means from another set of registering dials and a fixed arm on said movable lever alternately engaging the teeth of the registering gears for alternately locking the disconnected set of registering dials and unlocking the connected set of registering dials.

3. The combination in a metering device comprising a plurality of sets of registering dials, of a pivoted movable lever, means carried by said lever operated by the meter, direct connected momentary electro-magnetic means for alternately moving said lever to directly mesh said meter operated means with one of said sets of registering dials and disconnect said meter operated means from another set of registering dials, a fixed arm on said lever to engage the teeth of the registering gears for alternately locking the disconnected set of registering dials and unlocking the connected set of registering dials and adjustable means for holding said meter operated means in mesh with one set of registering dials in either operating position.

4. The combination in a metering device comprising a plurality of sets of registering dials, of a pivoted movable lever, means carried by said lever operated by the meter, direct connected momentary electro-magnetic means for alternately moving said lever to directly mesh said meter operated means with one of said sets of registering dials and disconnect said meter operated means from another set of registering dials, a fixed arm on said lever for alternately locking the disconnected set of registering dials and unlocking the connected set of registering dials, adjustable means for holding said meter operated means in either operating position and adjustable stops in fixed relation to the position holding means for limiting the movement of said lever.

5. The combination in a metering device comprising a plurality of sets of registering dials, of a pivoted movable lever, meter driven rotating means on said lever, momentary electro-magnetic means for alternately moving said lever to directly mesh said meter driven means with one of said sets of registering dials and disconnect said rotating means from another set of registering dials, a fixed arm on said lever for alternately locking the disconnected set of registering dials and unlocking the connected set of registering dials, adjustable means for holding said lever in either operating position, adjustable stops in fixed relation to the position holding means for limiting the movement of said lever and electric adjustable circuit switches in fixed relation to the position holding means which automatically alternately cut off the actuating current from the actuating electro-magnet as soon as the movable lever and meter driven means reaches its operating position and partially close the other electric circuit for the reverse movement of the movable lever.

6. The combination in a duplex metering device having a plurality of registering trains, of a movable meter driven gear wheel mounted on a pivoted arm, adjustable movement limiting stops, adjustable locking position holding springs, and means for automatically locking the disconnected set of registering trains and unlocking the connected set by an arm on the pivoted arm which engage the gears of the registering trains.

7. The combination in a duplex metering device having a plurality of registering trains of a movable meter driven gear wheel mounted on a pivoted arm, momentary electro-magnetic means for alternately meshing said gear wheel with one of the registering trains and adjustable movement limiting stops, position holding springs and electrical switches in fixed relation to each other to automatically cut out the actuating current as soon as the gear wheel reaches an operating position and to partially close the circuit for the reverse operation.

8. The combination in a metering device comprising a plurality of registering trains of a movable meter driven wheel mounted on a pivoted arm, a movable plate, means connecting said arm and plate and adjustable means cooperating with said plate for holding said arm in operating positions.

9. The combination in a metering device comprising a plurality of registering trains of a movable meter driven gear wheel mounted on a pivoted arm, a movable plate having recesses therein, means connecting said pivoted arm and plate and adjustable spring means cooperating with said recesses in said plate for holding said wheel in operative position without slipping or undue tension.

10. The combination in a metering device comprising a plurality of registering trains, of a pivoted arm, a movable meter driven gear wheel mounted on said pivoted arm, a plurality of sets of registering dials, a plurality of electro-magnets which when any one electro-magnet is energized moves the driven gear wheel out of direct mesh with one set of registering dials and into direct mesh with another set of registering dials and automatic adjustable contactors to cut off the energy from the actuating electro-magnet as soon as the movement is complete and to partially close other circuits for the next movement of the movable driven gear wheel.

11. The combination in a metering device comprising a plurality of registering trains of a movable meter driven gear wheel and locking stops mounted on a pivoted arm, so that the stops will alternately by the movement of the arm lock the registering dials not in mesh with the movable driven gear wheel and release the registering dials which are in mesh with the movable driven gear wheel.

12. The combination in a metering device comprising a plurality of registering trains of a pivoted movable lever, a meter driven gear wheel mounted on said lever, momentary electro-magnetic means for moving said gear wheel out of mesh with one set of registering trains, and into mesh with another set, a control circuit to a second metering device and relay switch contacts arranged to cooperate with said movable pivoted arm to close and open said control circuit.

13. The combination in a metering device comprising a plurality of sets of registering dials, of a movable pivoted lever, meter driven rotating means on said lever, momentarily operated electro-magnets for alternately moving said lever to directly mesh said meter driven rotating means with one of said sets of registering dials and disconnect said rotating means from another set of registering dials, a sliding plate connected to the movable lever and to the armatures of the electro-magnets, said plate having recesses for position holding springs and shoulders to limit the movement of said armatures, plate and movable lever.

14. The combination in a metering device comprising two sets of registering dials, of a pivoted lever, rotating means on said lever controlled by the meter, an integral interchangeable control unit connected to said lever by a removable pin, said interchangeable unit comprising two mechanically coupled electro-magnets whose fields are made up of interchangeable coils snapped into spring jack terminals, a sliding plate secured to said mechanical coupling, said plate having recesses to receive position holding members, shoulders which in conjunction with other members of this unit limit the movement of said plate, arm and rotating means, two interchangeable adjustable plates comprising spring jack terminals, position holding members, shoulder stops and electrical circuit switches which alternately open the circuit of the actuating electro-magnet and close at one point the circuit of the other electro-magnet.

15. The combination in metering devices, each unit comprising a plurality of registering trains, of momentarily operated electro-magnetic means for shifting the meter mechanisms from one train to another, multiple connections of the electric control circuits to operate a plurality of such meters and adjustable stops, position holding springs and contactors for cutting out of said control circuit each meter unit as the shifting means moves to the correct operating position.

16. The combination in a metering device having registering dials, of a pivoted arm, a movable meter driven gear wheel carried by said arm, a movable plate connected to said arm, electro-magnets for moving said plate, a plurality of adjustable plates on which are mounted stops to limit the movement of said first-named plate, arm and movable gear, means for holding said first-named plate in fixed positions, and contactors which cut off the current from the actuating electro-magnets and close at one point the energizing circuit to the other electro-magnet to facilitate the adjustment of the proper relation of the driven gear wheel to the registering dials.

17. The combination in a metering device comprising a plurality of registering trains, of a pivoted arm, a movable meter driven gear wheel carried by said arm, a movable plate connected to said arm, electro-magnets for moving said plate, a plurality of adjustable plates on which are mounted stops to limit the movement of said first-named plate, arm and movable gear, springs which hold said first-named plate in fixed positions, and contactors which cut off the current from the actuating electro-magnets and close at one point the energizing circuit to the other electro-magnet to facilitate the adjustment of the proper relation of the driven gear wheel to the registering dials.

DAVID M. CARR.